(12) United States Patent
Adamski et al.

(10) Patent No.: US 11,012,406 B2
(45) Date of Patent: May 18, 2021

(54) AUTOMATIC IP RANGE SELECTION

(71) Applicant: INTERNATIONAL BUSINESS MACHINES CORPORATION, Armonk, NY (US)

(72) Inventors: Joseph Henry Adamski, Ayer, MA (US); Zack Traube Grossbart, Cambridge, MA (US); Jennifer Erin Lanier, Austin, TX (US); Lauren Marie Rice, Cedar Park, TX (US); Megan Baxter Pollard, Volente, TX (US); Steven Garrett Raden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/371,232

(22) Filed: Apr. 1, 2019

(65) Prior Publication Data
US 2020/0314058 A1    Oct. 1, 2020

(51) Int. Cl.
*H04L 29/12*  (2006.01)
*H04L 12/24*  (2006.01)
*G06F 3/0484* (2013.01)
*H04L 29/08*  (2006.01)

(52) U.S. Cl.
CPC ...... *H04L 61/2007* (2013.01); *G06F 3/04842* (2013.01); *H04L 41/08* (2013.01); *H04L 41/22* (2013.01); *H04L 67/12* (2013.01)

(58) Field of Classification Search
CPC .. H04L 41/22; H04L 61/2007; H04L 61/2061
See application file for complete search history.

(56) References Cited

U.S. PATENT DOCUMENTS

| | | | |
|---|---|---|---|
| 6,792,474 B1 | 9/2004 | Hopprich | |
| 6,834,298 B1 * | 12/2004 | Singer | H04L 41/0253 709/220 |
| 7,515,546 B2 | 4/2009 | Gaspard | |
| 8,259,596 B1 | 9/2012 | Oak | |
| 8,725,860 B1 * | 5/2014 | Voltmer | H04L 61/2007 709/223 |
| 8,775,629 B1 | 7/2014 | Whittle | |

(Continued)

FOREIGN PATENT DOCUMENTS

WO    2006060072 A1    6/2006

OTHER PUBLICATIONS

Eidnes, "Practical Considerations for Network Addressing using CIDR", ACM 1994, pp. CAB-1-CAB-10.

(Continued)

*Primary Examiner* — Shean Tokuta
(74) *Attorney, Agent, or Firm* — Teddi E. Maranzano

(57) ABSTRACT

A method, system and computer program product for automatic IP range selection is provided. The GUI accepts user input for a parent IP range and IP range size, from which is calculated an address space prefix that corresponds to the address space that has the available IP range size. If the user does not provide input, the GUI fields are dynamically populated with default values for IP range, address prefix, address space, IP range, and number of addresses, wherein the default values are retrieved from a system IP network configuration.

14 Claims, 13 Drawing Sheets

(56) References Cited

U.S. PATENT DOCUMENTS

| | | | |
|---|---|---|---|
| 8,862,725 B1* | 10/2014 | Voltmer | H04L 41/042 709/224 |
| 9,369,403 B2 | 6/2016 | Schultze | |
| 9,582,233 B1* | 2/2017 | Osadchyy | G06F 3/1288 |
| 2002/0158900 A1 | 10/2002 | Hsieh | |
| 2003/0112765 A1* | 6/2003 | Gaspard | H04L 41/0213 370/252 |
| 2003/0236865 A1 | 12/2003 | Anthe | |
| 2004/0122974 A1 | 6/2004 | Murakami | |
| 2005/0071699 A1* | 3/2005 | Hammond | H02J 9/062 713/300 |
| 2006/0018325 A1* | 1/2006 | Conrad | H04L 29/12009 370/395.52 |
| 2006/0104295 A1* | 5/2006 | Worley | G06F 9/544 370/401 |
| 2006/0129669 A1* | 6/2006 | Kojima | H04L 41/082 709/223 |
| 2008/0244054 A1 | 10/2008 | Schomp | |
| 2009/0222547 A1* | 9/2009 | Boylan | H04L 61/00 709/223 |
| 2013/0275588 A1 | 10/2013 | Li et al. | |
| 2018/0041468 A1 | 2/2018 | Miller | |
| 2018/0367501 A1* | 12/2018 | Khan | H04L 41/22 |
| 2018/0375897 A1* | 12/2018 | Kawasaki | H04L 63/1491 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

AUTOMATIC IP RANGE SELECTION

BACKGROUND

The present invention generally relates to network addressing, and more specifically, to automatic IP range selection.

To configure network services for computing resources, a user typically is required to choose an IP address range using the Classless Inter-Domain Routing (CIDR) format to reserve a network. The IP address range that is chosen resides within one or more parent IP address ranges and must not overlap any previously reserved IP address ranges. The IP range must also be large enough to contain all of the computing resources that will exist on the network.

SUMMARY

Embodiments of the present invention are directed to a computer-implemented method for automatic IP range selection. A non-limiting example of the computer-implemented method includes visualizing, at a GUI of an IP range selection client, system network default values for IP range, address prefix, address space, IP range, and number of addresses, wherein the default values are retrieved from a system IP network configuration. Based on receiving input, wherein the input includes a parent IP range and an IP range size, the method visualizes an address space address prefix that corresponds to an address space having an available IP range size.

Embodiments of the present invention are directed to a system for automatic IP range selection. A non-limiting example of the system includes a processor and a memory communicatively coupled to the processor. The memory has stored therein instructions that when executed cause the processor to visualize, at a GUI of an IP range selection client, system network default values for IP range, address prefix, address space, IP range, and number of addresses, wherein the default values are retrieved from a system IP network configuration. The system also provides that based on receiving input, wherein the input includes a parent IP range and an IP range size, visualizing an address space address prefix that corresponds to an address space having an available IP range size.

Embodiments of the invention are directed to a computer program product for automatic IP range selection, the computer program product comprising a computer readable storage medium having program instructions embodied therewith. The program instructions are executable by a processor to cause the processor to perform a method. A non-limiting example of the method includes visualizing, at a GUI of an IP range selection client, system network default values for IP range, address prefix, address space, IP range, and number of addresses, wherein the default values are retrieved from a system IP network configuration. Based on receiving input, wherein the input includes a parent IP range and an IP range size, the computer program product visualizes an address space address prefix that corresponds to an address space having an available IP range size.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
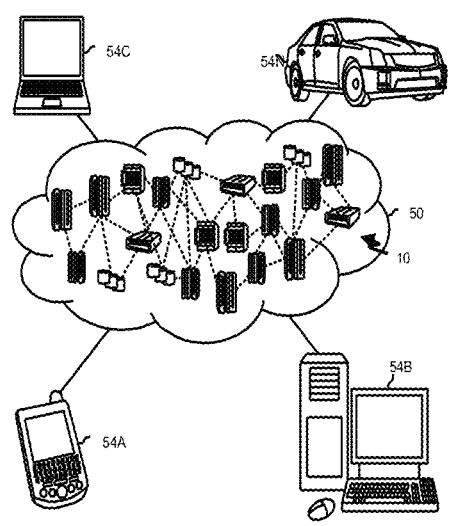
FIG. 1 depicts a cloud computing environment, according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Turning now to an overview of technologies that are more specifically relevant to aspects of the invention, configuring network services for computing resources, an administrator typically is required to choose an IP address range using the Classless Inter-Domain Routing (CIDR) format to reserve a network. The IP address range that is chosen resides within one or more parent IP address ranges and must not overlap any previously reserved IP address ranges. The IP range must also be large enough to contain all of the computing resources that will exist on the network. However, even though an administrator who configures network services typically has the highest security authorization, the network services tools may not include error checking capability to prevent network misconfiguration.

Consider a major cloud computing provider, having cloud regions world-wide, and each region having multiple sets of data centers. Each data center can include several thousand servers and other networked devices such as printers, routers, and networked storage devices. Each server can require several unique network connections, and therefore several IP addresses, for many purposes, a few of which include bandwidth, failover/recovery, and for the servers to communicate system control commands among them and with a command control point.

Incorrectly configuring a network IP address can result in a failure as simple as an end user's inability to connect to an application or printer. However, a misconfigured network can result in a more catastrophic system failure, such as a broadcast storm. This is a network condition in which messages broadcast on a network cause multiple hosts to respond by broadcasting their own messages, and so on. At a minimum, a broadcast storm results in performance degradation, but the performance can be so poor that the network ceases to function because of the excessive traffic.

Therefore, embodiments of the present invention tend to improve system reliability, availability and serviceability by providing automatic IP range selection, whereby administrator input is verified and error-checked prior to actually changing the network configuration.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
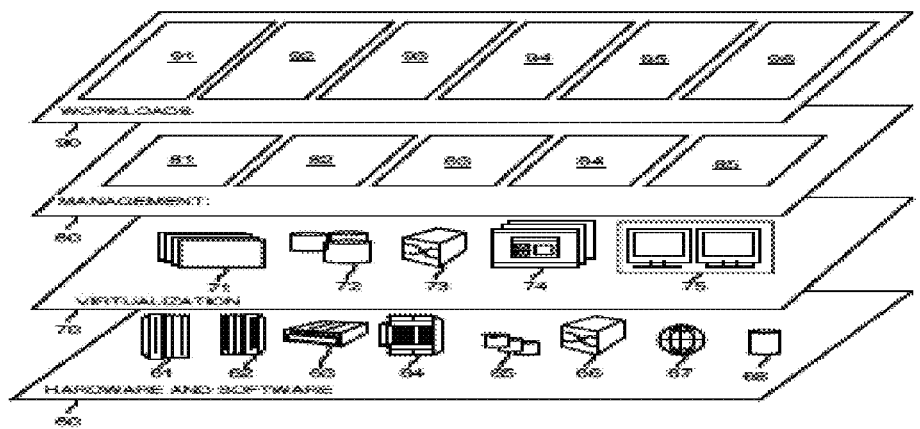
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; smart sampling processing 95; and recommendation processing 96.

Figure 3:
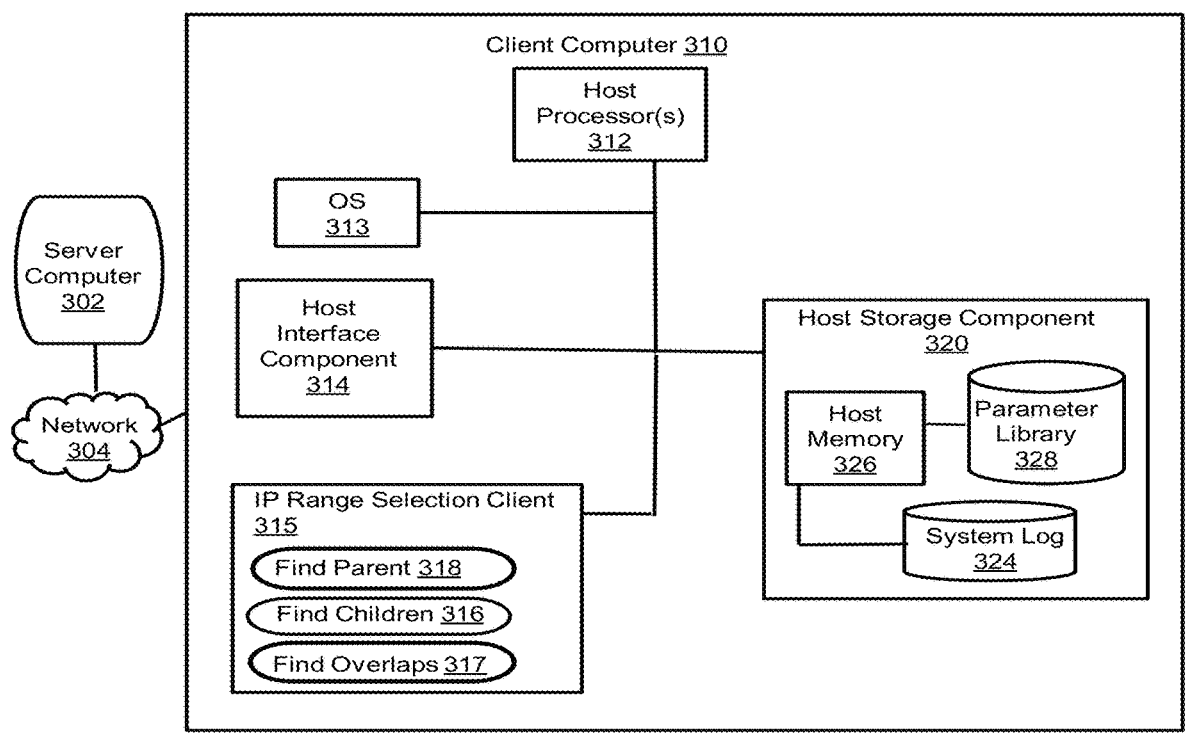
FIG. 3 depicts a high-level block diagram of an IP range selector client, according to embodiments of the present invention.

FIG. 3 depicts a high-level block diagram of a client computer 310 embodying an IP range selection client 315, according to embodiments of the present invention.

For ease of exposition, only one client computer 310 is shown. However, multiple client computers 310 may each execute unique sessions of the IP range selection client 315. Each client computer 310 connects to one or more server computers 302 over a network 304. Through the network 304, the IP range selection client 315 issues commands to configure IP address ranges on one or more server computers 302, or other networked components. The IP range selection client 315 can be implemented as a graphical user interface (GUI), shown in more detail with reference to FIGS. 6-8 and FIGS. 9-19. The IP range selection client 315 includes several code components and subroutines, two of which are shown. The Find Children 316 and Find Overlaps 317 subroutines will be described with reference to FIG. 4.

The client computer 310 can include one or more components, such as a host processor 312, operating system (OS) 313, a host interface component 314, an IP range selection client 315, and a host storage component 320. The host storage component 320 can include other components, such as host memory 326, a system parameter library 328, and a system log 324.

The host processor 312, the host interface component 314, and the host storage component 320 may be combined into a fewer number of components or may be separated into further components. Also, the host processor 312, the host interface component 314, and the host storage component 320 may be implemented in software or hardware, or a combination of software and hardware.

The host processor 312 is configured to control the operation of the client computer 310, and the operation of the IP range selection client 315. For example, the host processor 312 can initiate and manage the operations of each of the other components at the client computer 310. The host processor 312 may also update and manage user preferences and/or predefined settings in the parameter library 328.

The host processor 312 can be any suitable processor(s), controller(s) and/or digital signal processor(s) that can provide sufficient processing power for the client computer 310. In some embodiments, the host processor 312 can include more than one processor with each processor being configured to perform different dedicated tasks.

The host interface component 314 can be any interface that enables the client computer 310 to communicate with other devices and systems.

The host storage component 320 can store data and/or resources, including system parameters, user preferences, and other application parameters, in a system parameter library 328. The host storage component 320 also includes one or more system logs 324 where the client computer 310 stores the results of system activity, such as system events, trace data, and transaction execution results.

The host memory 326 can store data and/or resources for providing runtime environments to the IP range selection client 315. The host memory 326 can include RAM, ROM, or some other data storage elements, such as disk drives. The host memory 326 can store the host OS 313 that is operated by the host processor 312, and the IP range selection client 315 during execution.

The server computer 302 may be any networked computing device operable to connect to the network 304 through either a wired or wireless connection. Although one server computer 302 is shown, multiple server computers 302 can be assumed.

The network 304 can be any network capable of carrying data, including an IP-based network for communication between the IP range selection client 315 on the client computer 310 and any external server or client. The network 304 can be a managed IP network administered by a service provider and implemented in a wireless fashion, e.g., using wireless protocols and technologies, such as Wi-Fi, WiMAX. The network 304 can also be a packet-switched network such as a local area network, wide area network, metropolitan area network, Internet network, or other similar type of network environment. The network 304 may be a fixed wireless network, a wireless local area network (LAN), a wireless wide area network (WAN) a personal area network (PAN), a virtual private network (VPN), intranet or other suitable network system and includes equipment for receiving and transmitting signals.

Figure 4:
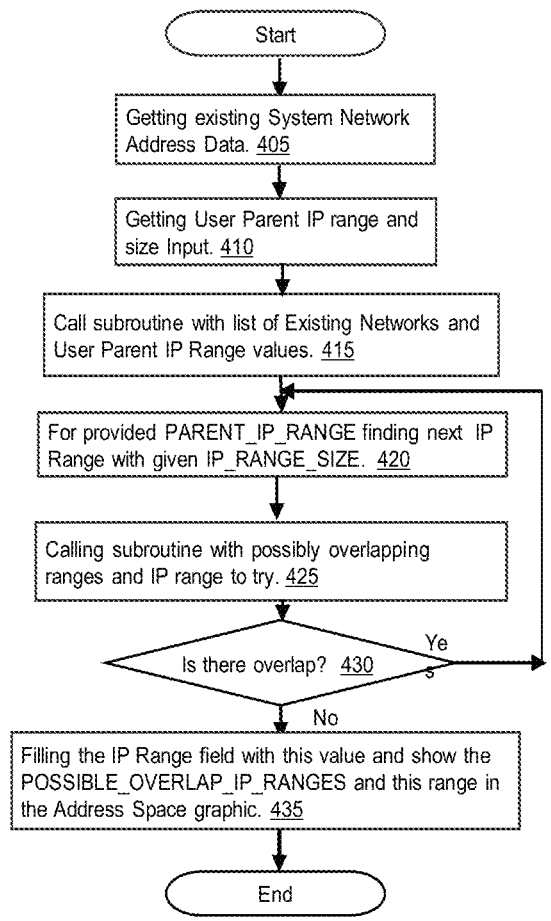
FIG. 4 depicts a flow chart of automatic IP address range selection, according to embodiments of the present invention.

FIG. 4 depicts a flow chart of automatic IP address range selection, according to embodiments of the present invention. The subroutines executing as the IP range selection client 315 take various inputs, such as a parent IP range and a requested IP range size, and calculate the next available IP range, i.e., subnet. The inputs come from the system and either default values or user input values. The calculated value may be used to then automatically configure resources or to be provided to a graphical user interface for visualization to the user.

System data includes configuration data from the system, such as parent IP ranges and existing subnet ranges. User input data includes parent IP range selection and the requested number of addresses, i.e., the requested range size that the IP range selection client 315 should reserve. This input is provided directly from user input or an automatic default if no selection is input. The automatic default is the first available address range that matches the calculated needed addresses. There can be more than one set of defaults to match against. For example, IP addresses may be segregated by function or geography. In this case, particular address prefixes may be available for allocation for a particular enterprise application. On the other hand, another set of address prefixes may be set aside based on the country where the server is physically located.

A parent IP range is a set of one or more IP address ranges that are potentially available for a user from which to reserve resources. These may also be referred to as address prefixes.

A server designates one of the address prefixes as the default The following Table 1 shows examples of address prefixes.

TABLE 1

Example Parent IP Ranges:
Address Prefix 1: 10.10.0.0/19 = [10.10.0.0-10.10.31.255] with 8192 addresses
Address Prefix 2: 10.20.0.0/20 = [10.20.0.0-10.20.15.255] with 4906 addresses
Address Prefix 3: 10.30.0.0/16 = [10.30.0.0-10.30.255.255] with 65536 addresses If the user has a preference, a parent IP range (or address prefix) may be selected. If the user has no preference, then the system address prefix is used as the input value. This choice comes from the set of parent IP ranges that the system provides. Referring to Table 1 above, Address Prefix 1, 10.10.0.0/19, is an example parent IP range.

An existing subnet IP range is a set of zero or more previously reserved IP ranges or subnets. These ranges reside within the previously defined parent IP ranges and are unavailable for use. The set of existing IP ranges may be potentially in the thousands, but for the purposes of illustration small sets of existing IP ranges are shown in Table 2.

TABLE 2

Example Existing Subnet IP Ranges:
IP Range 1: 10.10.0.0/22 = [10.10.0.0-10.10.3.255] with 1024 addresses
IP Range 2: 10.10.4.0/24 = [10.10.4.0-10.10.4.255] with 256 addresses
IP Range 3: 10.10.8.0/23 = [10.10.8.0-10.10.9.255] with 512 addresses
IP Range 4: 10.20.4.0/22 = [10.20.4.0-10.20.7.255] with 1024 addresses If the user knows how many addresses are needed to reserve this value may be input. This value is typically provided as a power of two ($2^n$) and may have a minimum and a maximum value. Examples of possible choices may be one from the following set of values: {16, 32, 64, 128, 256, 512, 1024, 2048, 4096}. If no value is provided, a system default value is used, for example 256.

FIG. 4 shows the flow of automatic IP address range selection by the IP range selection client 315 and the Find Children 316 and Find Overlaps 317 subroutines. In summary, the Find Children 316 subroutine takes as input a set of IP ranges and one parent IP range. These ranges come from the preconfigured definition of the network space. The subroutine finds the subset of IP ranges that are children of the parent IP range. A child IP range can be referred to as one that resides completely within the parent IP range. In summary, the Find Overlaps 317 subroutine takes as input a set of existing IP ranges and checks if the potential new IP range overlaps with any of the existing IP ranges. The existing IP ranges are part of the address prefixes that were defined as part of the virtual private cloud to specify the available address space. Once the required inputs pass error verification, the next available IP range is computed, according to the steps shown in FIG. 4. Examples of error verification are shown with reference to FIGS. 11-12.

At 405, the system data is retrieved. This includes existing IP ranges, default parent IP range, and the default IP range size. At 410, the user input is retrieved from the GUI. The IP range selection client 315 executes in the browser of an authorized user, where the user has the appropriate security credentials to perform network configuration. The input includes parent IP range and IP range size, or the default values if input was not provided.

At 415, the IP range selection client 315 calls a subroutine, such as the Find Children 316 subroutine with a list of existing subnets that reside in the user input—parent IP range, and the parent IP range. Where this address data is stored for retrieval is implementation dependent, but normally includes a combination of database, or other file storage, and configuration data residing on a server. All of the previously reserved subnets are input to the subroutine to find child IP ranges. This produces the set of all existing subnets that reside within the provided parent subnet, and helps to isolate the set of subnets that will be used for validation. This yields the set of Possible Overlap IP Ranges.

At 420, for the given address size find the next possible IP range of that size in the selected IP range. If this is the first try, the start of the parent IP range is used. For example, for parent IP range=10.10.0.0/19 and Address Size=256 (i.e., number of addresses), the first option would be 10.10.0.0/24, and the next choice would be 10.10.1.0/24, followed by 10.10.2.0/24. Each execution of step 420 yields the Try IP Range.

At 425, the Try IP Range is used to check for overlap with the Possible Overlap IP Ranges using the Find Overlaps 317 subroutine. Overlap is calculated by taking the starting point and then determining if that starting point plus the number of addresses overlaps the start of another network.

If at 430 there is an overlap, then processing returns to 420 to check the next IP range. If no overlap is found, then processing ends, since an IP range is found. Finally, the IP selection range client 315 fills the IP range field in the GUI with the resulting IP range, and any Possible Overlap IP Ranges, and displays the results to the user. The user may accept the results, or repeat the selection process.

Figure 5:
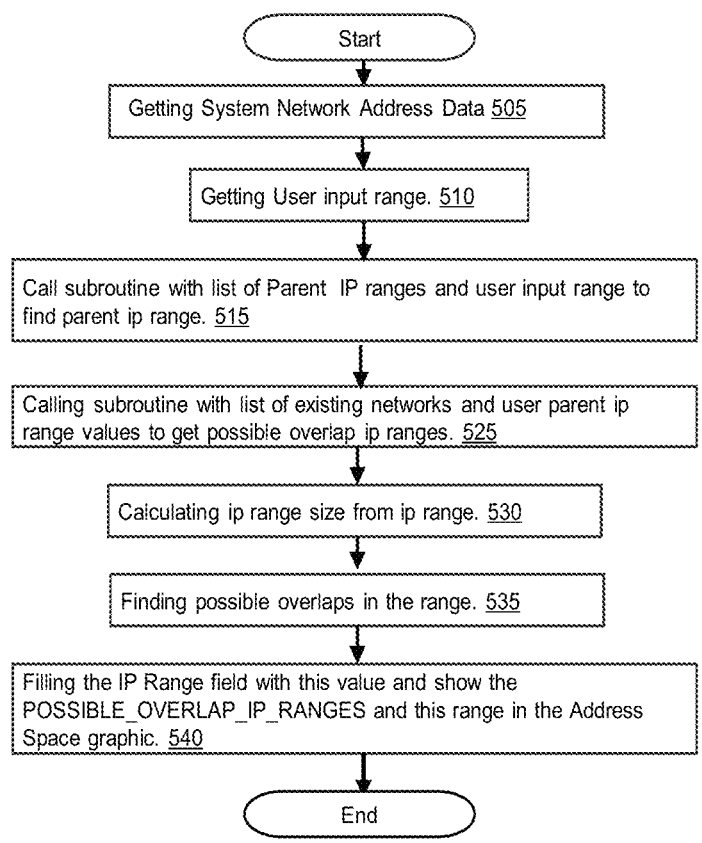
FIG. 5 depicts a flow chart for IP address range selection where the input is by manual entry of IP address range, according to embodiments of the present invention.

Turning now to FIG. 5, which shows a flowchart for IP address range selection by the IP range selection client 315 and the Find Children 316 and Find Overlaps 317 subroutines, where the input is by manual entry of IP address range. The IP range selection client 315 and the Find Children 316 and Find Overlaps 317 subroutines perform functions substantially similar to those described with reference to FIG. 4.

At 505, the system network address data is retrieved. This includes existing IP ranges, and the parent IP ranges. At 510, the user input is retrieved from the GUI. The user input includes the IP range (e.g., the number of IP addresses requested).

At 515, the IP range selection client 315 calls a subroutine, such as the Find Parent 318 subroutine with a list of parent IP ranges input retrieved from the system and the user input IP range. This produces the parent IP range.

At 525, the IP selection range client 315 calls a subroutine, such as Find Children 316 with a list of existing IP ranges from the system input data, and the user input range. This produces the Possible Overlap IP Ranges.

At 530, the IP selection range client 315 calculates an IP range size from the user input range. The calculation is by bitwise arithmetic, whereby the operation is performed on one or more bit patterns or binary numerals at the level of their individual bits. Here, the result of the calculation is a bitmask representing the IP range size.

At 535, the IP selection range client 315 calls a subroutine, such as Find Overlaps 317 using the Possible Overlap IP Ranges and the Try IP Range to determine if an overlap exists in the potential range for the requested number of IP addresses. Overlap is calculated by taking the starting point and then determining if that starting point plus the available address space overlaps the start of another network.

Processing ends at 540, where the IP selection range client 315 populates the IP range field in the GUI with the resulting IP range, and any Possible Overlap IP Ranges, and displays the results to the user. The user may select one of the returned resulting IP ranges that do not have an overlap, or may input a different IP range and repeat the process.

Figure 6:
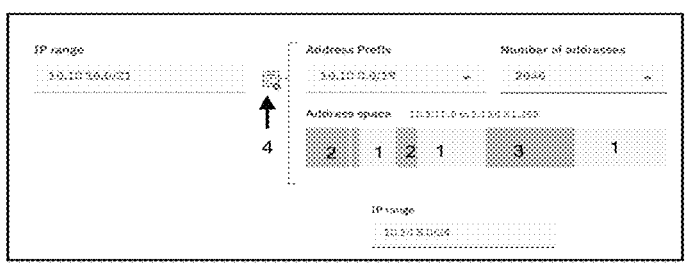
FIGS. 6-8 depicts views of the automatic subnet selection GUI, according to embodiments of the present invention.
Figure 7:
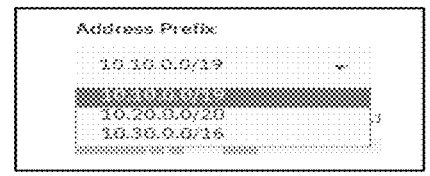
Figure 8:
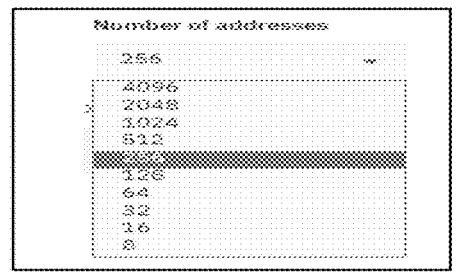

FIGS. 6-8 depicts views of the automatic subnet selection GUI. The GUI directs the user towards obtaining a valid available IP Range for reservation. It provides a value by default, which is the first available range meeting the requested IP range. If the user changes any of the possible determining parameters a new valid and available IP Range is automatically calculated and provided. Despite the automation, advanced users are still allowed to enter an IP Range directly, as conventional user interfaces typically do. The GUI includes at least the following fields shown in FIGS. 6-8.

Referring now to FIG. 6, the IP range is the selection that will be used for input to the IP selection range client 315.

When the IP selection range client 315 is in automatic entry mode, the IP range field is automatically filled in, according to the steps of FIG. 4. On initial page load for display, the IP range field is filled in by the GUI component of the IP selection range client 315 using default values for the other input fields. The default address prefix (parent range) field is the first available IP addresses. If the address prefix field is changed, the new value is sent to the IP selection range client 315 and a new IP range value is provided, according to the steps of FIG. 4 above. If the number of addresses selector is changed the new value is also input to the IP selection range client 315 and the IP range field is updated with the new value. The user is not required to enter values into the IP range field in automatic entry mode, if the calculated automatic subnet selection is satisfactory.

The IP selection range client 315 may also execute in manual mode. This can be efficient for users who already know the required IP range, since this can be directly entered manually into the IP range field. Alternatively, the values displayed on the GUI are automatically filled in, the values may be manually updated. If the entry is valid, the address prefix field and the number of addresses field are automatically updated according to the steps of FIG. 5. Validation includes a check that the input is proper CIDR format and is within the range of network addresses defined in the system configuration. Validation means starting after the beginning of one of the address prefixes and not extending beyond the end of the same address prefix. If an input entry is not valid and the error can be determined, the IP selection range client 315 notifies the user with an appropriate error message. This will be shown below with reference to FIGS. 9-19.

Continuing FIG. 6, with specific reference to the GUI fields, the address prefix shows the list of available parent IP ranges. These ranges define the space that is available to the user to choose. Upon completion of the steps of FIGS. 4-5, the choice of IP range should reside within one of the address prefixes (parent IP ranges), or else an error is recognized and displayed on the GUI. A more detailed view, showing the address prefix field as a pull-down selection is shown in FIG. 7. When an address prefix is selected in the GUI, the value is input to the IP selection range client 315, and following the steps of FIGS. 4-5, the IP range field is updated with a new valid IP range value.

The number of addresses field defines the number of host IP addresses that are available in the selected IP range. When this field is updated the number of addresses choice is input to the IP selection range client 315, and a newly calculated IP range is chosen and entered into the IP range field, following the steps of FIGS. 4-5. A more detailed view showing the number of addresses field as a pull-down selection is shown in FIG. 8.

The address space field is a graphical representation of the address space, i.e., the number of IP addresses, defined by the address prefix that has been selected. The first address in the range is on the left and the last address in the range is on the right. In the dynamic visualization of the address space, the space is broken into three different types, indicated as follows:

1) Available Space—this space is available for use.
2) Previously allocated space. Each block defines an already allocated IP range.
3) The space for the IP range entered into the IP range field.

These IP ranges may be further annotated to provide further information. For example, the existing subnet blocks (previously allocated space) could support hover over text to show information about the block such as the subnet CIDR or other existing subnet details that can be extracted from the system configuration data. The address space field may be implemented with color to distinguish between fields and to draw attention to fields, particularly if hover or some other type of highlighting is implemented.

FIG. 6 also includes a calculator graphic 4. This is a static page element that is used to express the idea that the IP range field is calculated automatically by the choice made in the address prefix and number of addresses fields.

FIGS. 9-19 depict examples of the dynamic behavior of the GUI interface. In the figures, fields may be implemented with color to distinguish between fields and to draw attention to fields, particularly if hover or some other type of highlighting is implemented. The fields displayed in the GUI are calculated by a combination of user input, system configuration values, and the steps of FIGS. 4-5.

It should be noted that the displayed changes in IP range, and address space in FIGS. 9-19 are the results of bitwise operations that calculate the new bitmasks. The bitmasks are applied to the binary values of IP range and address space, thereby transforming the binary values into displayable characters in the GUI. Note also, that in the figures, the GUI component of the IP range selection client 315 dynamically visualizes the changed values by appropriately altering the dimensions of the fields that correspond to fields in the CIDR in the address space.

Similar to FIG. 6, in the dynamic visualization of the address space, the indicators correspond as follows:

1) Available Space—this space is available for use.
2) Previously allocated space. Each block defines an already allocated IP range.
3) The space for the IP range entered into the IP range field.

Manual Entry of IP Range [10.20.40.0/22]—Valid Data

Figure 9:
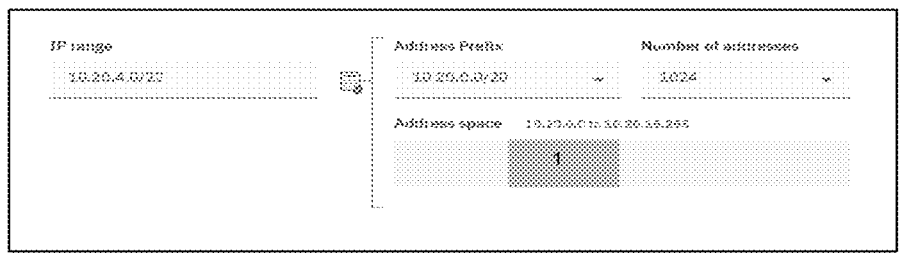
FIGS. 9-19 depict the dynamic behavior of the GUI interface, according to embodiments of the present invention.

In FIG. 9, the user manually enters an IP range. This automatically selects the correct address range (address prefix) and the number of addresses in the pull-down menus. In the GUI interface, the chosen IP address range (shown as "1") is highlighted, by color for example, to visualize the address space.

Manual Entry of IP Range—Invalid CIDR

Figure 10:
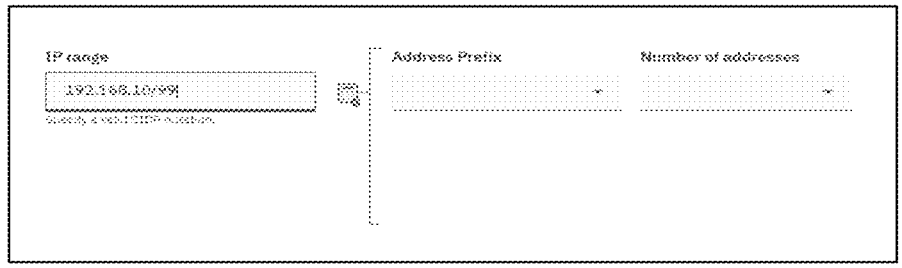

In FIG. 10, if the user enters an invalid value, such as a poorly formed subnet CIDR, then a validation message is shown. Here, the user enters a poorly formed CIDR selection. In CIDR format, there is no such range as the "/99". Since there is no valid address prefix or number of addresses, none is shown. In addition, since the IP range is not valid the address space graphic is not shown.

Manual Entry of IP Range—Overlapping Existing Range

Figure 11:
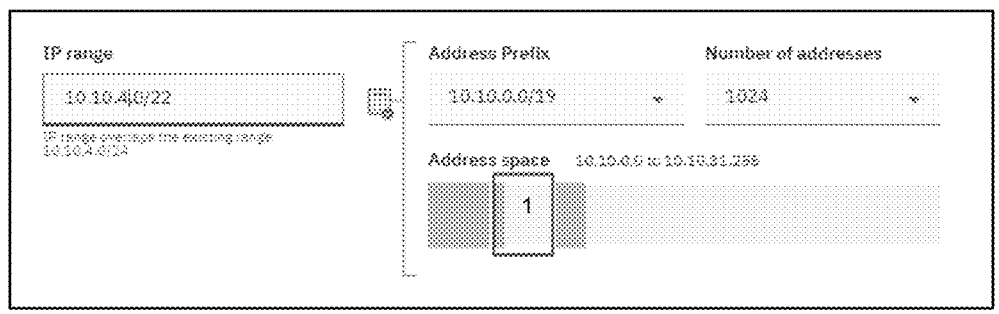

In FIG. 11, if the user enters a range selection that overlaps an already reserved address space then a validation message is shown and the range overlap is shown in the address space graphic, here as "1".

Manual Entry of IP Range—Range Not in One of Available Parent Ranges

Figure 12:
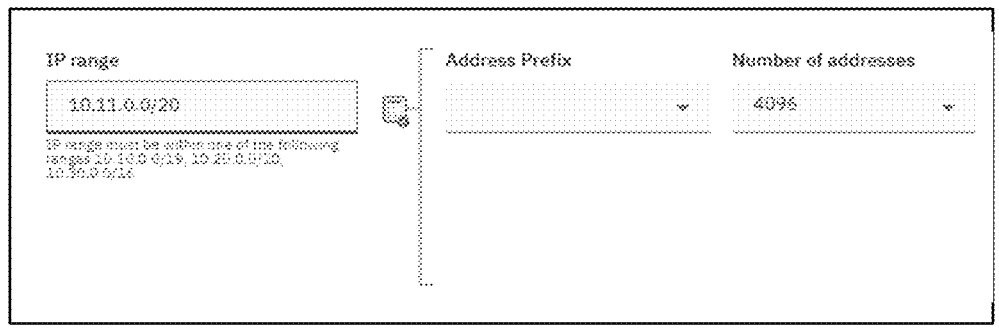

In FIG. 12, if the user enters a range selection that does not fall within one of the available address spaces then an appropriate validation message is shown.

Initial Load—Automatic Defaults—With Existing Subnets

Figure 13:
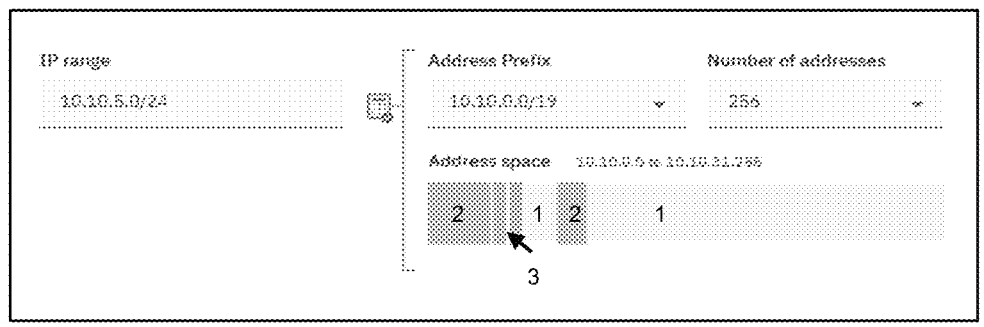

FIG. 13 shows the initial default selection for a parent range that has subnets previously reserved by this, or another user. The IP selection range client 315 automatically chooses the next valid available block (address space). In this case, the next valid available address range is shown as 10.10.5.0/24.

User Changes Number of Addresses—To 512

Figure 14:
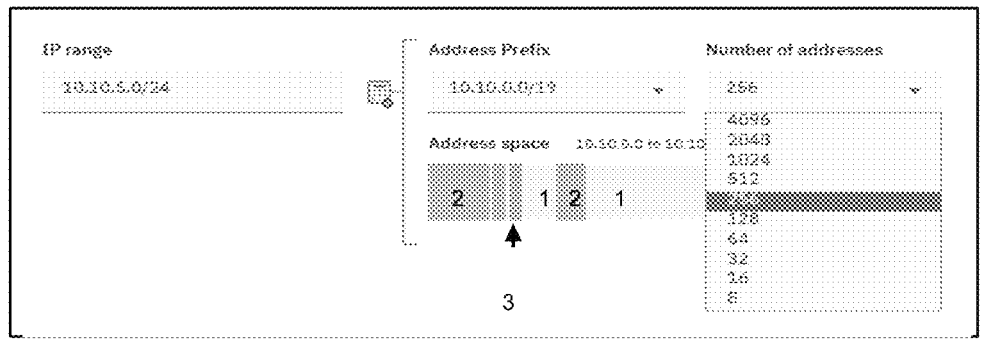

FIG. 14 shows the GUI interface behavior if the user decides that the automatically chosen number of addresses is insufficient. In this case, the user may choose a different number of addresses by making a selection from the pull-down menu.

Figure 15:
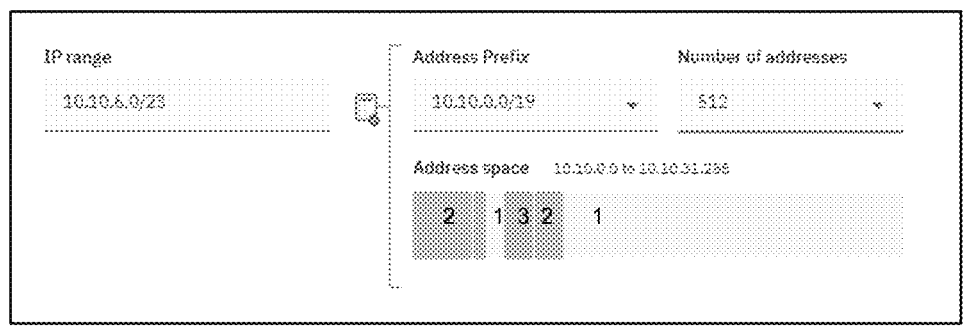

Next, in FIG. 15, the user chooses "512" as the number of addresses from the pull-down menu. In response, the IP range selection client 315 calculates the next available address space, which is 10.10.6/23. Note that the IP range changes from 10.10.5.0/24 in FIG. 14 to 10.10.6.0/23 in FIG. 15, in response to the new calculation. Note also, that the address space graphic changes to reflect the new address space values.

User Changes Number of Addresses—To 1024

Figure 16:
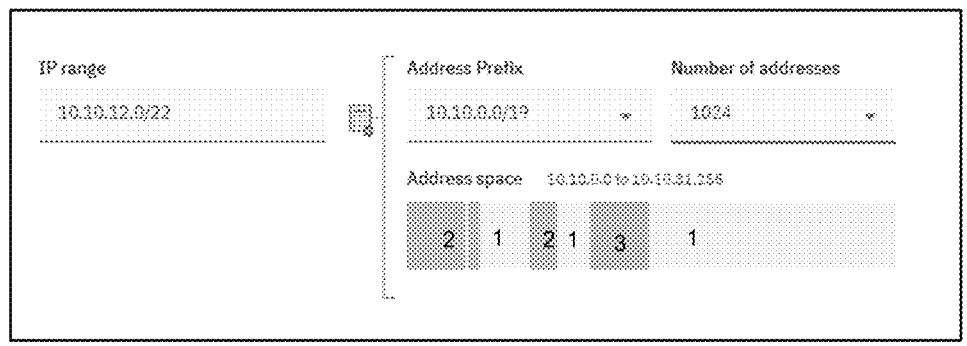

In FIG. 16, the user chooses "1024" as the number of addresses, and the IP range selection client 315 chooses the next available address space block, which is 10.10.12.0/23. The previously chosen address space block did not contain enough contiguous addresses so a different range was chosen. Note that the IP range changes from 10.10.6.0/23 in FIG. 15 to 10.10.12.0/22 in FIG. 16, in response to the new calculation. Note also, that the address space graphic changes to reflect the new address space values.

User Changes Number of Addresses—To 2048

Figure 17:
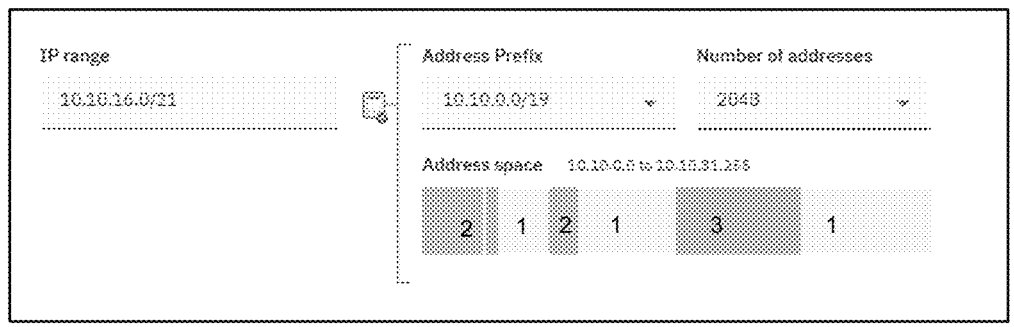

In FIG. 17, the user selects an even larger number of addresses "2048". The IP range selection client 315 chooses the next available address space block, which is 10.10.16.0/23. The previously chosen block did not contain enough contiguous addresses so a different range was chosen. Note that the IP range changes from 10.10.12.0/22 in FIG. 16 to 10.10.16.0/21 in FIG. 17, in response to the new calculation. Note also, that the address space graphic changes to reflect the new address space values.

User Changes Address Prefix (Parent Range)

Figure 18:
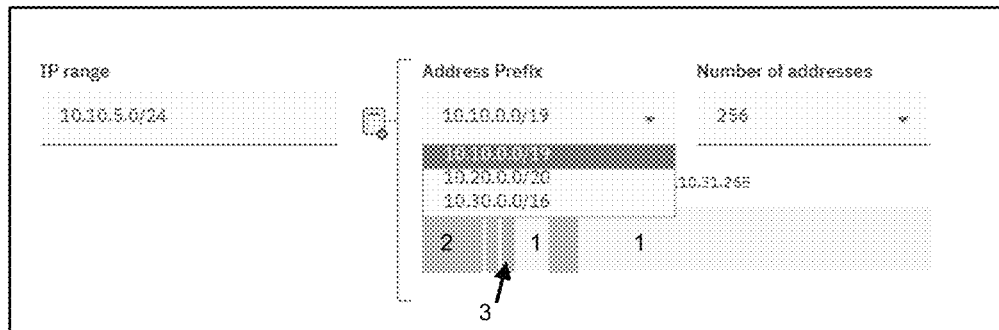

In FIG. 18, a new address prefix (parent range) is selected from the pull-down menu. For example, the data corresponding to address prefix 10.10.0.0/19 is currently displayed. However, a new address prefix of 10.20.0.0/20 is about to be selected. When the selection is made, the IP range selection client 315 selects the next available block (address space) in the new parent range.

Figure 19:
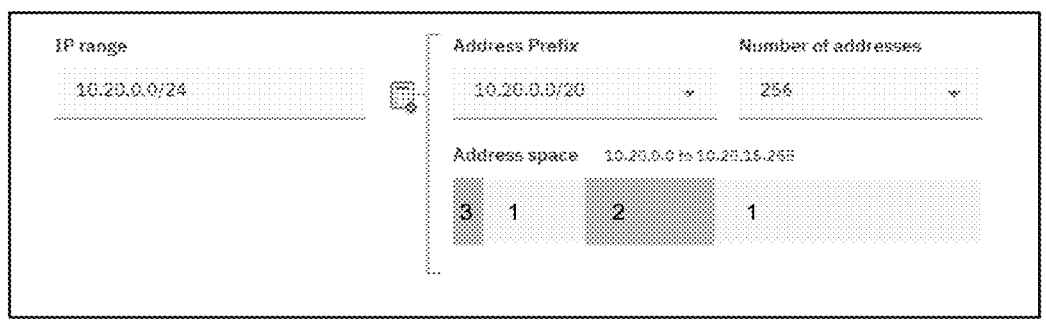

FIG. 19, shows the new values being displayed in the GUI following the selection of the new parent range. Note also, that the address space graphic changes to reflect the new address space values.

Figure 20:
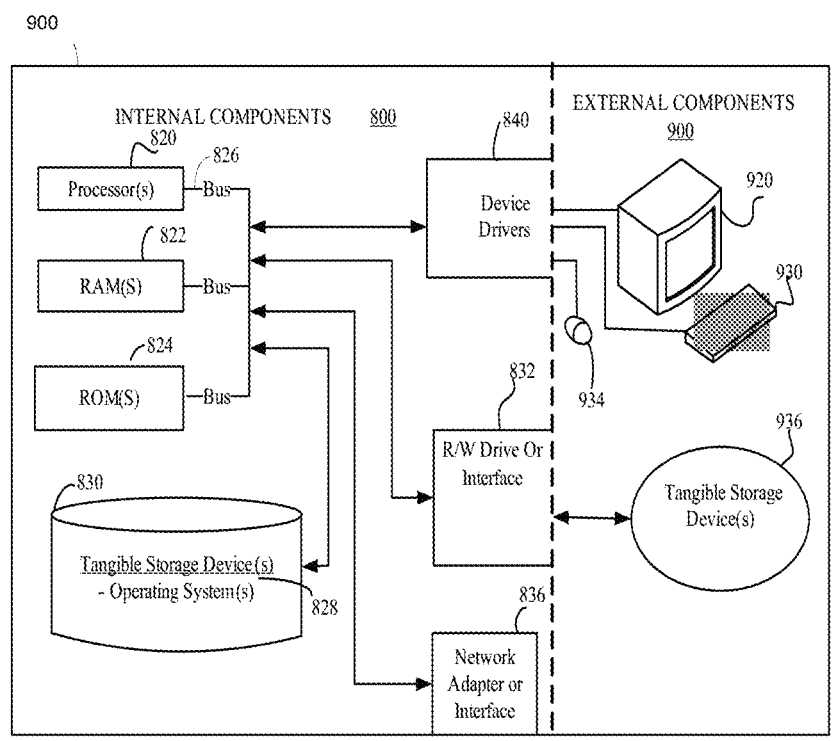
FIG. 20 is a block diagram of an embodiment of a computer system or cloud server in which the present invention may be implemented.

FIG. 20 is a block diagram of internal and external components of computers and servers depicted in FIG. 1 according to at least one embodiment.

It should be appreciated that FIG. 20 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer 310 and the server computer 302 may include respective sets of internal components 800 and external components 900 illustrated in FIG. 20. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as an IP range selection client 315, may be stored on one or more computer-readable tangible storage devices 830 for execution by one or more processors 820 via one or more RAMs 822 (which typically include cache memory). In the embodiment illustrated in FIG. 20, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The transaction processing system 110 and IPUR 250 can be stored on one or more of the respective portable computer-readable tangible storage devices 936, read via the respective R/W drive or interface 832 and loaded into the respective hard drive 830.

Each set of internal components 800 may also include network adapters (or switch port cards) or interfaces 836 such as a TCP/IP adapter cards, wireless Wi-Fi interface cards, or wireless interface cards or other wired or wireless communication links. The software components of the IPUR 250 can be downloaded from an external computer (e.g., server) via a network (for example, the Internet, a local area network or other, wide area network) and respective network adapters or interfaces 836. From the network adapters (or switch port adaptors) or interfaces 836, the software components of the IP range selection client 315 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for automatic IP range selection, comprising:
    visualizing, at a GUI of an IP range selection client, system network default values for IP range, address prefix, address space, IP range, and number of addresses, wherein the default values are retrieved from a system IP network configuration, wherein the visualizing further comprises:
    calculating, by bitwise arithmetic, a bitmask that represents the address space;
    applying the bitmask to binary values of the IP range and the address space, wherein the binary values are displayable characters in the GUI of the IP range selection client; and
    dynamically visualizing the IP range and the address space by appropriately altering dimensions of fields that correspond to fields in a CIDR;
    validating user input, by the IP range selection client, for poorly formed CIDR, overlapping IP range selection, and range selection not falling within an available address space;
    displaying at the GUI of the IP range selection client an error validation message; and
    based on receiving input, wherein the input includes a parent IP range and an IP range size, visualizing an address space address prefix that corresponds to an address space having an available IP range size.

2. The method of claim 1, further comprising:
    retrieving, from the system IP network configuration, existing subnets that are within the parent IP range, and reserved subnets that are within the parent IP range.

3. The method of claim 1, further comprising:
    sequentially checking each existing subnet and reserved subnet for overlap, wherein overlap is calculated by taking a starting point address of the parent IP range and adding the number of addresses; and
    visualizing the IP range field of the GUI of the IP range selection client.

4. The method of claim 1, further comprising:
    highlighting, by color, the dimensions of the fields that correspond to the fields in the CIDR.

5. A system for automatic IP range selection, comprising:
    one or more processors, one or more computer-readable storage devices, and a plurality of program instructions stored on at least one of the one or more storage devices for execution by at least one of the one or more processors, the plurality of program instructions comprising:

visualizing, at a GUI of an IP range selection client, system network default values for IP range, address prefix, address space, IP range, and number of addresses, wherein the default values are retrieved from a system IP network configuration, wherein the visualizing further comprises:
  calculating, by bitwise arithmetic, a bitmask that represents the address space;
  applying the bitmask to binary values of the IP range and the address space, wherein the binary values are displayable characters in the GUI of the IP range selection client; and
  dynamically visualizing the IP range and the address space by appropriately altering dimensions of fields that correspond to fields in a CIDR;
validating user input, by the IP range selection client, for poorly formed CIDR,
overlapping IP range selection, and range selection not falling within an available address space;
displaying at the GUI of the IP range selection client an error validation message; and
based on receiving input, wherein the input includes a parent IP range and an IP range size, visualizing an address space address prefix that corresponds to an address space having an available IP range size.

6. The system of claim 5, further comprising:
retrieving, from the system IP network configuration, existing subnets that are within the parent IP range, and reserved subnets that are within the parent IP range.

7. The system of claim 5, further comprising:
sequentially checking each existing subnet and reserved subnet for overlap, wherein overlap is calculated by taking a starting point address of the parent IP range and adding the number of addresses; and
visualizing the IP range field of the GUI of the IP range selection client.

8. The system of claim 1, further comprising:
highlighting, by color, the dimensions of the fields that correspond to the fields in the CIDR.

9. The system of claim 5, wherein the IP range selection client executes in a browser of an authorized user, wherein the authorized user has appropriate security credentials to perform network configuration.

10. A computer program product for automatic IP range selection, comprising a computer-readable storage medium having computer-readable program code embodied therewith, the computer-readable program code when executed on a computer causes the computer to:
visualizing, at a GUI of an IP range selection client, system network default values for IP range, address prefix, address space, IP range, and number of addresses, wherein the default values are retrieved from a system IP network configuration, wherein the visualizing further comprises:
  calculating, by bitwise arithmetic, a bitmask that represents the address space;
  applying the bitmask to binary values of the IP range and the address space, wherein the binary values are displayable characters in the GUI of the IP range selection client; and
  dynamically visualizing the IP range and the address space by appropriately altering dimensions of fields that correspond to fields in a CIDR;
validating user input, by the IP range selection client, for poorly formed CIDR,
overlapping IP range selection, and range selection not falling within an available address space;
displaying at the GUI of the IP range selection client an error validation message; and
based on receiving input, wherein the input includes a parent IP range and an IP range size, visualizing an address space address prefix that corresponds to an address space having an available IP range size.

11. The computer program product of claim 10, further comprising:
retrieving, from the system IP network configuration, existing subnets that are within the parent IP range, and reserved subnets that are within the parent IP range.

12. The computer program product of claim 10, further comprising:
sequentially checking each existing subnet and reserved subnet for overlap, wherein overlap is calculated by taking a starting point address of the parent IP range and adding the number of addresses; and
visualizing the IP range field of the GUI of the IP range selection client.

13. The computer program product of claim 10, further comprising:
highlighting, by color, the dimensions of the fields that correspond to the fields in the CIDR.

14. The computer program product of claim 10, wherein the IP range selection client executes in a browser of an authorized user, wherein the authorized user has appropriate security credentials to perform network configuration.

* * * * *